July 11, 1950 R. D. SHAPTER 2,514,806
VORTEX-TYPE GAS BURNER
Filed June 15, 1945 2 Sheets-Sheet 2

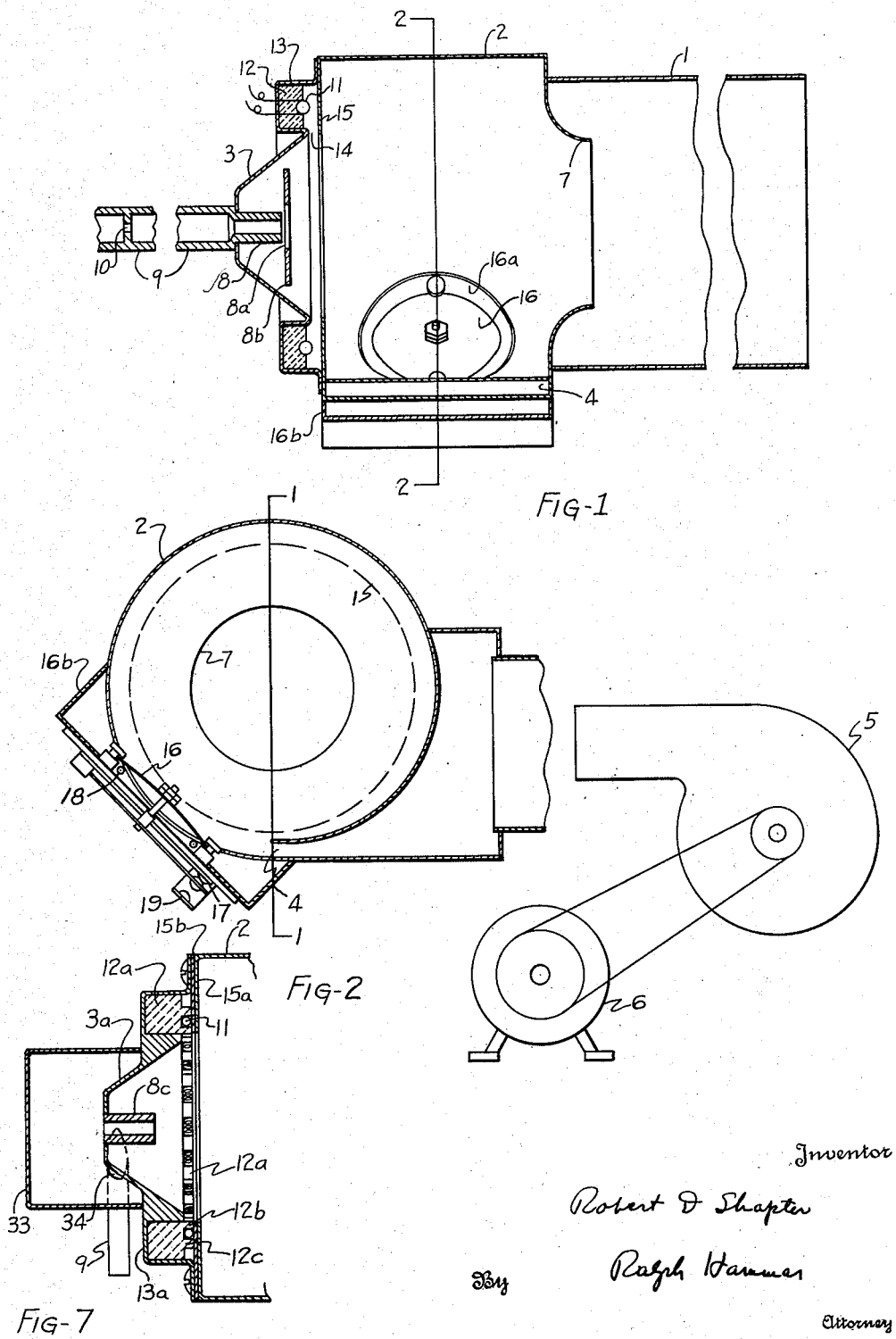
July 11, 1950     R. D. SHAPTER     2,514,806
VORTEX-TYPE GAS BURNER
Filed June 15, 1945     2 Sheets-Sheet 1

Inventor
Robert D Shapter
By Ralph Hammar
Attorney

Patented July 11, 1950

2,514,806

UNITED STATES PATENT OFFICE 2,514,806

VORTEX-TYPE GAS BURNER

Robert D. Shapter, Erie, Pa., assignor to Lovell Manufacturing Company, Erie, Pa., a corporation of Pennsylvania Application June 15, 1945, Serial No. 599,717

10 Claims. (Cl. 158—7)

This invention relates to a burner in which combustion takes place at the center of a vortex and is particularly concerned with improving the combustion, ignition and control. The advantages of the burner are particularly apparent for burning gas which is a difficult fuel to burn. Further objects and advantages appear in the specification.

Figure 3:
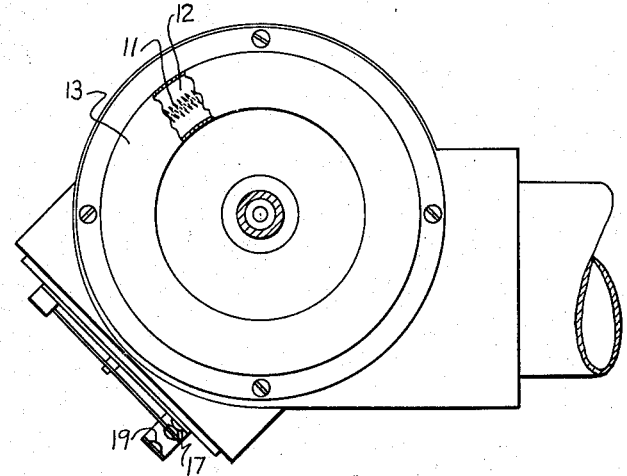
Figure 6:
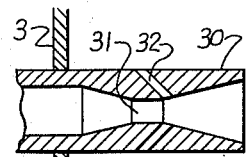
Figure 5A:
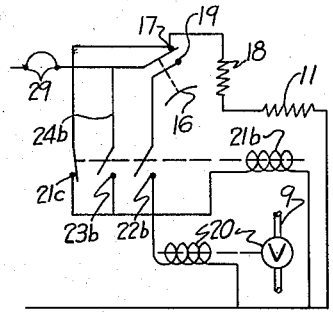
Figure 4:
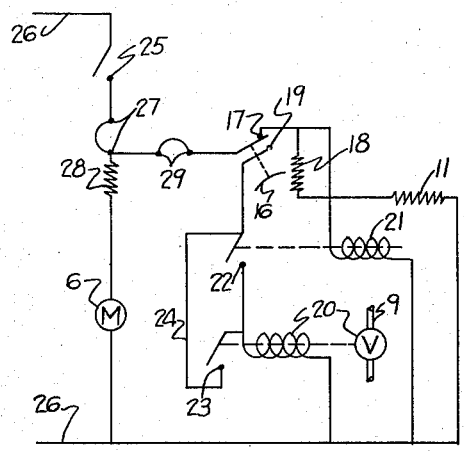
Figure 5:
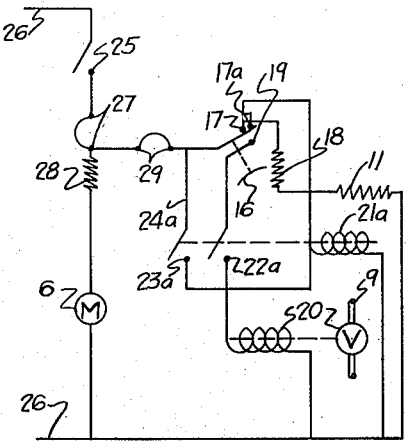

In the drawings, Fig. 1 is a longitudinal section of a burner on line 1—1 of Fig. 2; Fig. 2 is a section on line 2—2 of Fig. 1; Fig. 3 is an end view of the fuel feeding end of the burner; Fig. 4 is a control diagram; Fig. 5 is another control diagram; Fig. 5a is a fragmentary diagram for use with either Fig. 4 or 5; Fig. 6 is a detail of an alternative fuel injection construction; and Fig. 7 is a modification of the fuel injection chamber.

The burner comprises a combustion tube 1, a combustion air chamber 2, and a fuel injection chamber 3. The combustion air chamber is of a shape to support a vortex, such as a scroll shape, and the combustion air is admitted tangentially at the outer periphery of the scroll through an inlet nozzle 4 connected to a blower 5 driven by a motor 6. The air in the combustion chamber is given a whirling motion in the form of a vortex induced by the tangential inlet. For best operation the inlet should have a ratio of axial length to radial thickness greater than 6:1. An attempt is made to concentrate the air in a narrow band at the periphery of the scroll. Ratios of up to 16:1 have been used.

The combustion air flows through an orifice 7 at the entrance to the combustion tube and spirals along the combustion tube. The orifice 7 forms a restricted throat at the entrance to the combustion tube so that upon passing through the orifice the air expands against the walls of the combustion tube producing a turbulence at the entrance and which aids in mixing the fuel and air and tends to move the combustion zone toward the entrance end of the tube. The combustion air also whirls about the conical walls of the fuel injection chamber 3 and sets up a vortex around the sides of a fuel injection nozzle 8 which projects axially into the core of the vortex. The nozzle may discharge through an orifice 8a in an annular baffle plate 8b. This plate may be omitted. The fuel injection nozzle is connected to a gas line 9 having a metering orifice 10. The gas discharged from the nozzle is directed axially through the combustion air chamber into the combustion tube and diffuses into the combustion air. The burning of the gas starts at the nozzle and proceeds with a spiral flame as the fuel is entrained in the whirling combustion air.

If the combustion tube is of metal, it is particularly adapted for radiant heating and the walls of the tube will be heated to red heat. Since the combustion starts from the inside of the vortex and progresses outward, the inner walls of the combustion tube are protected from the maximum flame temperature by a blanket of combustion air. The spiral progression of the combustion along the combustion tube is indicated by the heating of the tube in which the brighter red zones of maximum temperature are spiraled along the combustion tube. The pitch of the spiral i. e., the axial progression along the tube per revolution of the air starts at substantially the width of the nozzle 4, and gradually increases as the air progresses along the tube 1 (right in Fig. 1)

The burner, or more strictly speaking, the fuel is lighted by a hot wire coil 11 mounted on a ceramic base 12 in a chamber 13 at the outer end of the fuel injection chamber 3 and communicating therewith through a narrow slot 14. The slot is behind a plate 15 which shields the chamber 13 from the radiant heat of combustion. The ignition coil 11 is heated to incandescence before the fuel supply is turned on. When the fuel supply is turned on, the fuel diffuses into the ignition chamber 13 through the slot 14 and is ignited by contact with the ignition coil 11. The ignited mixture expands and is forced out of the ignition chamber. Thereafter the combustion takes place at the core of the combustion air vortex and there is no combustion within the ignition chamber. The ignition coil is insulated from the flame by the combustion air vortex sweeping past the slot 14 and is shielded from the heat of combustion by the plate 15. It does not substantially increase in temperature after ignition even though the heating current is left on.

Flame failure protection as well as a time delay between the starting of the combustion air and the fuel injection is provided by a thermostatic element 16 arranged in an opening 16a on the inner periphery of the combustion air chamber 2 in the path of the combustion air stream discharged from the nozzle 4. A box 16b encloses the rear of the element 16. When the thermal element is cold it closes contact 17 in the supply circuit of a heater coil 18 adjacent the thermal element. By making the heater 18 of larger size, it may be placed in the connection between the blower 5 and the nozzle 4 to heat the combustion air and thereby heat the thermal element. When heated the thermal element opens the contact 17 and closes contact 19 in the circuit of a normally closed solenoid valve 20 in the gas fuel line. As soon as combustion starts the heat of combustion radiates to the thermal element 16 and keeps it heated so as to maintain the contact 19 closed. If the combustion stops for any reason, the thermal element is cooled by the combustion air and the contact 19 is opened and the contact 17 closed.

The fuel supply will also be cut off if the power supply is interrupted, de-energizing the solenoid valve 20. Even for a momentary interruption it is desirable that the burner be shut down and restarted since the temperature in the combustion tube may be insufficient to ignite the fuel. This is accomplished by interposing a time delay between the closing and reopening of the solenoid valve 20. In the present construction the thermal element 16 is utilized for providing the time delay through a relay 21 energized through the contact 17, closed only when the thermal element 16 is cool so that if the power supply is interrupted the relay 21 can be energized only after the thermal element has cooled. The relay 21 when energized closes normally open contacts 22 in the circuit of the solenoid valve 20. The opening of the contact 17 upon operation of the thermal element 16 deenergizes the relay 21 but its contacts 22 do not open until after the contact 19 has been closed and the solenoid valve energized. The solenoid valve has contacts 23 in a holding circuit 24 which keep it energized after the contacts 22 are opened. Upon power failure while the burner is operating, the contacts 23 open and since the contacts 22 are open, energizing of the solenoid valve is not possible until the relay 21 has been energized through the contact 17. This can only take place when the thermal element 16 has cooled. It is therefore impossible to supply raw fuel to the burner except when combustion is taking place or until the ignition circuit has been energized by the closing of the contact 17.

The burner is controlled by a switch 25 in the power line 26. Closing the switch 25 energizes the combustion air motor 6 through contacts 27 of a thermal overload protecting device 28. The contacts 27 are closed during normal operation and open when the motor is overloaded, for example, by bearing failure which would reduce the speed so that an adequate supply of combustion air would not be furnished. Other motor protective devices may be used. The ignition coil 11 is fed through the combustion motor circuit through the contact 17. The ignition coil cannot be turned on unless the combustion motor is operating normally since under abnormal operation of the combustion motor the protective contacts 27 will be opened. The contact 17 controls the circuit to the heating element 18 and to the relay 21. The relay 21 picks up instantaneously and closes the contacts 22 in the circuit of the solenoid valve 20. The heating element 18 causes the opening of the contact 17 and the closing of the contact 19 in the circuit of the solenoid valve 20.

From one aspect the thermal element 16 and the relay 21 constitute a time delay relay interposed between the circuit 20 to provide for a time delay between the turning on of the ignition coil and the opening of the fuel supply. This time delay insures the heating of the ignition coil to the proper temperature before the fuel supply is turned on.

It will be noted that the control system is arranged so that failure of any of the elements shuts down the burner. Failure of the combustion air motor 6 causes the opening of the protective contacts 27. Failure of the ignition coil 11 opens the circuit to the heating element 18 and prevents energizing the solenoid valve 20. Failure of the heating element 18 prevents the heating of the thermal element 16 to close the contact 19 in the solenoid valve circuit. Upon momentary failure of the power supply or upon opening of over temperature control contacts 29, the relay 21 opens the contacts 22 and the solenoid valve 20 closes, opening its holding contacts 23. The circuit to the solenoid valve cannot be reestablished until the thermal element 16 has cooled sufficiently to close the contact 17.

The control diagram of Fig. 5 is similar in operation to the control diagram of Fig. 4, and corresponding parts are indicated by the same reference numerals. The principal difference in Fig. 5 is the substitution of a relay 21a for the relay 21 which controls contacts 22a in the circuit of the solenoid valve and also controls contacts 23a in a holding circuit 24a. In effect the holding circuit has been taken off the solenoid valve and placed on the relay. The relay is energized through a contact 17a closed by the thermal element 16 concurrently with the contact 17. The purpose of the additional contact is to prevent energizing of the heating and ignition coils 18 and 11 through the relay 21a after the contact 17 has been opened.

The operation is the same as the control diagram of Fig. 4. Upon interruption of the power while the burner is operating the solenoid valve 20 and the relay 21a drop out and the burner cannot be restarted until the thermal element 16 has cooled to close the contacts 17 and 17a.

In Fig. 5a is shown a further modification having a relay 21b energized through normally closed contacts 21c connected to the contact 17 by the thermal element 16. When the relay 21b is energized it closes contacts 22b in circuit with the solenoid valve and contacts 23b in a holding circuit 24b. In this modification all of the contacts necessary to secure the time delay between shutting down and restarting of the burner are associated with the relay 21b. There is no difference in operation.

For high combustion rates and stability of the combustion under variations in the gas pressure, it is important that the combustion start at the fuel injection orifice. If the combustion does not start at this point and a solid jet of unignited or unburning fuel is present in front of the orifice, there is a tendency for the fuel to mix with the air at a localized zone at or in the combustion chamber and burn there with a blue flame and with incomplete combustion. In the Fig. 1 construction this is avoided by extending the fuel injection nozzle 8 axially into the core of the combustion air vortex so that the whirling combustion air can get in back of the fuel stream and diffuse into the outside of the fuel stream at the nozzle orifice. This provides a combustible mixture at the outer surface of the fuel stream in which combustion can start. The fuel injection nozzle 8 discharges through the opening 8a in the baffle plate 8b partially closing the outer end of the fuel injection chamber 3. Combustion air enters the annular space between the baffle plate 8b and the fuel chamber 3 and whirls around the fuel injection nozzle 8. The fuel injection orifice is slightly in back of the baffle plate and discharges through the central opening 8a. The discharged fuel stream has an aspirator action tending to draw combustion air into the outer surface of the fuel stream.

In Fig. 6 the fuel discharge orifice 30 extends axially into the fuel injection chamber 3 in the same manner as nozzle 8 and is provided at its base with a Venturi throat 31 having air inlets 32 into which air is drawn with an aspirator action.

The combustion takes place with a luminous yellow flame varying to white which starts at the fuel nozzle outlet, expands gradually through the center of the combustion air chamber and very nearly fills the combustion tube from the outlet edge of the orifice 7. The combustion is completed in a short length of the combustion tube at a heat release of the order of 1,000,000 B. t. u. per hour per cubic foot. Due to the high speed rotation of the combustion air, there may be slippage between the outer and inner layers of air and the angular velocity at the center which contains the fuel stream (and the products of combustion) may be equal to or less than the angular velocity of the air adjacent the walls of the combustion tube. In effect, the combustion air is wrapped around the fuel stream which initially has no component of rotation but which gradually picks up rotational speed as combustion takes place until finally when combustion is complete the entire mass has a more nearly uniform angular velocity. There is a continual eddying. This and the high temperatures of combustion make measurements of the velocity difficult.

A 30,000 B. t. u. per hour burner has been constructed with a 2½" combustion tube, a scroll 2" in axial width with an entrance slot ⅛" wide (by 2" long), and an air inlet velocity of 4,750 feet/minute. In this the combustion was completed in the first 10" of length of the combustion tube. In a 75,000 B. t. u. per hour burner, the combustion tube was 4" in diameter, the scroll 2½" wide, the combustion air entrance slot 3/16" wide (by 2½" long) and an air inlet velocity of 5,600 feet/minute. In this the combustion is completed in 10" of the combustion tube. In such burners, the inlet nozzle or entrance slot has a ratio of axial width to radial thickness greater than 6:1 and the air inlet velocity is of the order of 20,000 $d$ feet/minute where $d$ is the diameter of the combustion tube in feet.

Velocity measurements made with a Pitot tube indicate the same general pattern of velocity distribution during burning as with the gas supply cut off and only air supplied to the burner. The highest tangential velocity is at the outside and the lowest tangential velocity is at the center. Starting with a maximum at the inlet nozzle, the velocity at the outside (adjacent the inner surface of the combustion air chamber and combustion tube) gradually decreases throughout the combustion zone. The velocity at the center gradually increases relative to the outside velocity from the combustion air chamber toward the end of the combustion zone. After leaving the combustion air chamber, where the velocity varies with the distance from the air inlet nozzle (continually decreases and becomes a minimum 360 degrees from the inlet nozzle), the velocities in any plane through the combustion tube are substantially constant at all radii. The air in the combustion tube is made up of concentric spirals, the outermost spiral adjacent the inner surface of the tube having the greatest tangential velocity and the greatest axial velocity or pitch, and the innermost spiral having the smallest tangential velocity and the smallest axail velocity or pitch. At the beginning of the combustion zone (adjacent the combustion air chamber) the velocity at the outside decreases and the velocity at the center increases but is always less than the outside velocity. In effect the velocity at the outside is progressively transferred to the inner layers and the gradient or rate of change of velocity between the successive layers decreases. At any point in the combustion zone the velocity decreases from the outside toward the center. While the velocity of the concentric spiral layers varies throughout the combustion zone, the pitch of the respective layers does not materially change.

During burning, the Pitot tube readings have to be corrected for the temperature of the burning gases. The Pitot tube readings have the same general pattern as those observed when the gas supply is cut off, indicating a diffusion or mixture of the gas and air throughout all parts of the combustion zone. The slippage between the layers causes turbulence which promotes the intermixture of gas and air necessary for thorough and rapid combustion.

Some idea of the relative velocities can be obtained from measurements made with the gas off in the 2½ inch burner. At the beginning of the combustion tube, the velocity at the outside has decreased from 4,750 feet/minute at the inlet nozzle to 3,300 feet/minute. 2⅜ inches down the tube the velocity at the outside is 2,560 feet/minute. 5⅜ inches down the tube, toward the end of the zone of maximum combustion, the velocity at the outside is 2,000 feet/minute. At the plane 2⅜ inches from the beginning of the combustion tube, the velocity decreases toward the center faster than the radius becoming close to zero 3/32 inch from the center. Further down the tube, the relative velocity at the center is greater, but in all parts of the combustion zone, the magnitude is less at the center than at the outside.

The velocity distribution, which results from the effort to keep the combustion air in a thin layer adjacent the outside of the combustion tube, results in thorough and rapid combustion with a very stable flame. The figures given show that the air cannot be kept in this thin layer but the air with the highest rotational and axial velocity is in this layer and the air has progressively lower axial and rotational velocities toward the center. When a wider inlet nozzle is used, the velocity at the center increases and the combustion is not as rapid or as stable.

In Fig. 7 is a modification of the fuel injection and ignition which may be applied to the burner of Fig. 1. The plate 15a at the end of the combustion chamber 2 has an inside diameter slightly less than the diameter of the orifice 7 to bring the ignition coil closer to the core of the vortex and thereby obtain more rapid ignition. So long as the ignition coil is outside the burning fuel stream and shielded from the flame by the plate 15a, it may be close to the fuel stream without becoming overheated. The ignition coil 11 is carried on an annular ceramic base 12a between annular rows of circumferentially spaced teeth 12b and 12c. The gas diffuses into contact with the ignition coil through the spaces between the teeth. The base 12a is carried in an annular recess 13a in the outer part of the conical fuel injection chamber 3a. The fuel injection chamber is fastened to the outside of the plate 15a and a sheet of mica 15b provides electrical insulation between the coil 11 and the plate 15a. At the apex of the fuel injection chamber is a nozzle 8c which may take the place of the metering orifice in the gas line. Enclosing the rear of the fuel injection chamber is a pressure equalizing chamber 33 having a tangential inlet 34 connected to the gas line 9. The gas swirls around the outside of the fuel injection chamber and is to some extent preheated. The primary object of the pressure equalizing chamber is to provide a smooth flow of gas into the nozzle 8c. This stabilizes the combustion and decreases streamers of burning gas at the end of the combustion zone.

What I claim as new is:

1. In a gas burner, walls defining a combustion air chamber in which there is substantially no combustion, means for supplying substantially all of the combustion air to the chamber in the form of a spiral layer or band having a width substantially equal to the axial length of the combustion air chamber at a velocity such that the greatest part remains adjacent the inner surface of the chamber creating a vortex of greatest tangential velocity at the outside and least at the center and having a pitch substantially equal to the width of the band, a generally coaxial heat transmitting combustion tube in which the combustion takes place leading from one side of the chamber around the axis of the vortex, and a gas injection nozzle projecting into the core of the vortex on the opposite side of the chamber around which air swirls in contact with the nozzle and the gas stream discharged therefrom and produces a combustible mixture at the nozzle discharge at which combustion starts.

2. In a gas burner, walls defining a combustion air chamber in which there is substantially no combustion, means for supplying substantially all of the combustion air to the chamber in the form of a spiral layer or band having a width substantially equal to the axial length of the combustion air chamber at a velocity such that the greatest part remains adjacent the inner surface of the chamber creating a vortex of greatest tangential velocity at the outside and least at the center and having a pitch substantially equal to the width of the band, a generally coaxial heat transmitting combustion tube in which the combustion takes place coaxial with the vortex leading from one side of the chamber, a wall closing the other side of the chamber, and a gas injection nozzle discharging gas from the other side of the chamber toward the combustion tube and positioned so the vortex whirls around and in contact with the nozzle at the rear of the nozzle orifice as regards the direction of gas flow and produces a combustible mixture at the nozzle discharge at which combustion starts.

3. In a gas burner, walls defining a combustion air chamber in which there is substantially no combustion, means for supplying substantially all of the combustion air to the chamber in the form of a spiral layer or band having a width substantially equal to the axial length of the combustion air chamber at a velocity such that the greatest part remains adjacent the inner surface of the chamber creating a vortex of greatest tangential velocity at the ousidte and least at the center, a generally coaxial heat transmitting combustion tube in which the combustion takes place leading from one side of the chamber around the axis of the vortex, a gas injection nozzle projecting into the core of the vortex on the opposite side of the chamber around which air swirls in contact with the nozzle and the gas stream discharged therefrom, and produces a combustible mixture at the nozzle discharge at which combustion starts, and walls defining an orifice at the entrance to the combustion tube smaller than the adjacent section of the tube beyond the orifice for producing a turbulence causing the combustion to fill the tube immediately beyond the orifice.

4. In a gas burner, walls defining a combustion air chamber in which there is substantially no combustion, means for supplying substantially all of the combustion air to the chamber in the form of a spiral layer or band having a width substantially equal to the axial length of the combustion air chamber at a velocity such that the greatest part remains adjacent the inner surface of the chamber creating a vortex of greatest tangential velocity at the outside and least at the center, a generally coaxial heat transmitting combustion tube in which the combustion takes place coaxial with the vortex leading from one side of the chamber, a wall closing the other side of the chamber, a gas injection nozzle discharging through said wall toward the combustion tube at the center of the vortex, and walls defining a restricted throat through which the vortex flows into the tube, the throat being smaller than the combustion tube beyond the throat as regards the direction of flow and the throat producing a turbulence causing the combustion to fill the tube immediately beyond the throat.

5. In a gas burner, walls defining a combustion air chamber, means for supplying substantially all of the combustion air to the chamber in the form of a spiral layer at a velocity such that the greatest part remains adjacent the inner surface of the chamber creating a vortex of greatest tangential velocity at the outside and least at the center, a generally coaxial combustion tube in which the combustion takes place leading from one side of the chamber around the axis of the vortex, means injecting gas centrally into the opposite side of the chamber, and a thermal flame detector for controlling the burner, said detector being located on the inner peripheral surface of the chamber in contact with the layer of combustion air to receive radiant energy from the flame.

6. In a gas burner, walls defining a combustion air chamber, means for supplying substantially all of the combustion air to the chamber in the form of a spiral layer adjacent the inner surface of the chamber creating a vortex, a generally coaxial combustion tube in which the combustion takes place coaxial with the vortex leading from one side of the chamber, means injecting gas into the chamber from the other side of the chamber toward the combustion tube, and a thermal flame detector for controlling the burner, said detector being located on the inner peripheral surface of the chamber in contact with the layer of combustion air to receive radiant energy from the flame.

7. In a gas burner, walls defining a generally cylindrical combustion air chamber in which there is substantially no combustion, means for supplying substantially all of the combustion air tangentially to the chamber in the form of a spiral layer or band through an inlet extending throughout the axial length of the chamber and at a velocity such that the greatest part remains adjacent the inner surface of the chamber creating a vortex of greatest tangential velocity at the outside and least at the center, a generally coaxial heat transmitting combustion tube of less diameter than the chamber in which the combustion takes place leading from one side of the chamber around the axis of the vortex causing the air to hug the tube, and a gas injection nozzle projecting into the core of the vortex on the opposite side of the chamber around which air swirls in contact with the nozzle and the gas stream discharged therefrom and produces a combustible mixture at the nozzle discharge at which combustion starts.

8. In a gas burner, walls defining a generally cylindrical combustion air chamber in which there is substantially no combustion, means for supplying substantially all of the combustion air to the chamber in the form of a spiral layer or band through an inlet extending throughout the axial length of the chamber and at a velocity such that the greatest part remains adjacent the inner surface of the chamber creating a vortex of greatest tangential velocity at the outside and least at the center, a generally coaxial heat transmitting combustion tube in which the combustion takes place coaxial with the vortex leading from one side of the chamber, and walls forming a throat at the entrance to the combustion tube of less diameter than the chamber causing the air to hub the tube, and a gas injection nozzle projecting into the core of the vortex on the opposite side of the chamber around which air swirls in contact with the nozzle and the gas stream discharged therefrom and produces a combustible mixture at the nozzle discharge at which combustion starts.

9. In a gas burner, walls defining a scroll shaped combustion air chamber, a flat nozzle for supplying substantially all of the combustion air to the chamber in the form of a spiral layer adjacent the periphery of the walls at a velocity such that the greatest part remains adjacent the inner surface of the chamber creating a vortex of greatest tangential velocity at the outside and least at the center, the nozzle having a ratio of axial width to radial thickness greater than 6:1, means for forcing air through the inlet at a velocity of the order of $20000d$ feet/minute where $d$ is the diameter of the combustion tube in feet, a generally coaxial combustion tube of less diameter than the chamber in which the combustion takes place leading from one side of the chamber around the axis of the vortex, and a gas injection nozzle projecting into the core of the vortex on the opposite side of the chamber around which air swirls in contact with the nozzle and the gas stream discharged therefrom.

10. In a gas burner, walls defining a scroll shaped combustion air chamber, a flat nozzle for supplying substantially all of the combustion air to the chamber in the form of a spiral layer at a velocity such that the greatest part remains adjacent the inner surface of the chamber creating a vortex of greatest tangential velocity at the outside and least at the center, the nozzle having a ratio of axial width to radial thickness greater than 6:1, means for forcing air through the inlet at a velocity of the order of $20000d$ feet/minute where $d$ is the diameter of the combustion tube in feet, a generally coaxial combustion tube in which the combustion takes place coaxial with the vortex leading from one side of the chamber, walls forming a throat at the entrance to the tube of less diameter than the chamber, a wall closing the other side of the chamber, and a gas injection nozzle discharging gas from the other side of the chamber toward the combustion tube and positioned so the vortex whirls around and in contact with the nozzle at the rear of the nozzle orifice as regards the direction of gas flow.

ROBERT D. SHAPTER.

REFERENCES CITED

The following references are of record in the file of this patent:

UNITED STATES PATENTS

| Number | Name | Date |
| --- | --- | --- |
| 1,436,132 | Wilcox | Nov. 21, 1922 |
| 1,594,020 | Smith | July 27, 1926 |
| 1,670,819 | Morris et al. | May 22, 1928 |
| 1,745,178 | McCabe | Jan. 28, 1930 |
| 1,762,868 | Kais | June 10, 1930 |
| 1,791,181 | White | Feb. 3, 1931 |
| 1,957,207 | Harrington | May 1, 1934 |
| 2,000,733 | Avery | May 7, 1935 |
| 2,005,832 | Vidale | June 25, 1935 |
| 2,018,582 | Theunissen | Oct. 22, 1935 |
| 2,073,552 | Curioni | Mar. 9, 1937 |
| 2,097,255 | Saha | Oct. 26, 1937 |
| 2,159,658 | Hall | May 23, 1939 |
| 2,191,640 | Beveridge | Feb. 17, 1940 |
| 2,249,489 | Noak | July 15, 1941 |
| 2,255,672 | Mason | Sept. 9, 1941 |
| 2,263,170 | Haedike | Nov. 18, 1941 |
| 2,296,686 | Ragan | Sept. 22, 1942 |
| 2,323,767 | Hammond | July 6, 1943 |
| 2,368,827 | Hanson et al. | Feb. 6, 1945 |